(12) United States Patent
Cho

(10) Patent No.: US 6,957,528 B1
(45) Date of Patent: Oct. 25, 2005

(54) NO REDUCTION WITH DIESEL FUEL REFORMED BY NONTHERMAL HYPERPLASMA

(75) Inventor: Byong Kwon Cho, Rochester Hills, MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 10/864,717

(22) Filed: Jun. 9, 2004

(51) Int. Cl.[7] .............................................. F01N 3/00
(52) U.S. Cl. ......................... 60/275; 60/274; 60/286; 60/295; 60/301
(58) Field of Search ................ 60/274, 275, 295, 60/301; 204/164, 176, 177; 422/186, 186.04

(56) References Cited

U.S. PATENT DOCUMENTS

| | | | | |
|---|---|---|---|---|
| 5,412,946 A | * | 5/1995 | Oshima et al. ............... | 60/286 |
| 5,855,855 A | * | 1/1999 | Williamson et al. ... | 422/186.04 |
| 6,038,853 A | * | 3/2000 | Penetrante et al. ........... | 60/274 |
| 2004/0000476 A1 | | 1/2004 | Cho et al. .................... | 204/179 |
| 2004/0107695 A1 | | 6/2004 | Cho et al. ..................... | 60/275 |

OTHER PUBLICATIONS

U.S. Appl. No. 10/734,094, filed Dec. 11, 2003, entitled "Method Of Reducing NOx In Diesel Engine Exhaust", Cho et al.

SAE Paper 971716 entitled "Vehicle Exhaust Treatment Using Electrical Discharge Methods" by Tonkyn et al., presented at International Spring Fuels & Lubricants Meeting, Dearborn, MI, May 5-8, 1997.

SAE Paper 982511 entitled "Diesel NOx Reduction on Surfaces in Plasma" by Balmer et al., presented at International Spring Fuels & Lubricants Meeting and Exposition, San Francisco, DA, Oct. 19-22, 1998.

* cited by examiner

Primary Examiner—Thomas Denion
Assistant Examiner—Diem Tran
(74) Attorney, Agent, or Firm—Kathryn A. Marra

(57) ABSTRACT

The reduction of $NO_x$ in diesel engine exhaust gas, typically at about 200° C. to 400° C., is accomplished using a dual bed NaY—CuY zeolite reduction catalyst. The effectiveness of the catalyst in reducing the nitrogen oxides is markedly increased by the separate and sequential additions of plasma reformed diesel fuel and ozone to the exhaust before it contacts the powdered catalyst. Reformed diesel fuel is obtained by withdrawing fuel from on-board storage, heating the withdrawn volume and stripping a more volatile fraction with air and passing the air/volatile diesel fuel fraction through a non-thermal plasma reactor. Ozone is obtained by blowing ambient air through a second non-thermal plasma reactor.

11 Claims, 4 Drawing Sheets

NO REDUCTION WITH DIESEL FUEL REFORMED BY NONTHERMAL HYPERPLASMA

TECHNICAL FIELD

The present invention relates generally to reduction of nitrogen oxides in exhaust gas from a diesel engine. More specifically, this invention pertains to treating the $NO_x$ content of the exhaust with the separate additions of reformed diesel fuel and ozone before passing the exhaust into contact with a base metal-exchanged zeolite reduction catalyst.

BACKGROUND OF THE INVENTION

Diesel engines are operated at higher than stoichiometric air to fuel mass ratios for improved fuel economy. Such lean-burning engines produce a hot exhaust with a relatively high content of oxygen and nitrogen oxides ($NO_x$). The temperature of the exhaust from a warmed up diesel engine is typically in the range of 200° to 400° C. and has a representative composition, by volume, of about 10–17% oxygen, 3% carbon dioxide, 0.1% carbon monoxide, 180 ppm hydrocarbons, 235 ppm $NO_x$ and the balance nitrogen and water.

These $NO_x$ gases, typically comprising nitric oxide (NO) and nitrogen dioxide ($NO_2$), are difficult to reduce to nitrogen ($N_2$) because of the high oxygen ($O_2$) content in the hot exhaust stream. It is, thus, an object of the present invention to provide an improved method of reducing $NO_x$ in such gas mixtures. It is a more specific object of the present invention to provide a method of modifying diesel exhaust with reformed diesel fuel before the exhaust is treated with a zeolite type $NO_x$ reduction catalyst.

SUMMARY OF THE INVENTION

This invention provides a method of reducing $NO_x$ in a diesel engine exhaust stream using a dual bed reduction reactor containing base metal-exchanged Y zeolite catalysts. In accordance with the method, separate additions of plasma-reformed diesel fuel and ozone are made to the exhaust gas stream at locations upstream of the catalytic reduction reactor. These additions modify the exhaust composition to improve the performance of the $NO_x$ reduction catalysts without degrading them.

In the present invention, the $NO_x$ containing exhaust is ultimately passed into contact with a dual bed catalyst in which the upstream bed is sodium Y zeolite or barium Y zeolite and the downstream bed is copper Y zeolite. These base metal-exchanged Y-type zeolite catalysts will sometimes be referred to in this specification as NaY, BaY or CuY, respectively. The effectiveness of the dual bed catalyst is promoted by prior addition of plasma-reformed diesel fuel to the exhaust gas followed by the addition of ozone. The ozone addition converts NO to $NO_2$ before the exhaust reaches the reduction catalyst reactor. The reformed diesel fuel assists in the reduction of NO and $NO_2$ to $N_2$ over the base metal-exchanged Y zeolite catalysts.

Ozone for addition to the exhaust stream is suitably generated by passing ambient air through a suitable ozone generator. The ozone containing air is injected into the exhaust stream. Plasma reformed diesel fuel is suitably prepared using fuel withdrawn from the engine's fuel tank. The withdrawn volume of the low volatility diesel fuel is heated and fractionated by bubbling air through it to vaporize a low-boiling fraction of the diesel fuel hydrocarbons. The air-entrained, vaporized diesel fuel fraction is passed through a non-thermal plasma generator to reform the fuel for injection into the exhaust stream. The higher boiling fraction of the fuel is suitably returned either to the fuel tank or to the fuel delivery line for use in the engine.

The vaporized fraction of the diesel fuel contains its smaller hydrocarbon molecules. These hydrocarbon molecules are reformed (broken up into smaller radicals and oxidized by ozone) in the hyperplasma reactor. The reformed diesel fuel comprises effective reductant species for $NO_2$ and is introduced into the exhaust downstream of the ozone addition. As stated above, the ozone oxidizes NO in the exhaust gas to $NO_2$. The $NO_2$ is then reduced to $N_2$ by reaction with reformed diesel fuel constituents over the dual bed base metal-exchanged Y zeolite catalysts.

An efficient non-thermal hyperplasma reactor is used to reform the fractionated fuel stream. The same type of plasma reactor may also be used for ozone generation. In a preferred embodiment, the plasma generator is a tube having a dielectric cylindrical wall defining a reactor space. A linear, high voltage electrode is disposed along the axis of the tube within this reactor space. An outer ground electrode, comprised of electrically conductive wire, is spirally wound around the cylindrical dielectric wall in a sequential pattern having a selected pitch that provides an axially discrete spacing between each turn of the wire. Application of a high frequency, AC voltage to the central electrode creates plasma in the ambient air passed through the reactor. The combination of the helical ground electrode having a discrete spacing between each turn and the linear axial electrode produces intertwined helical regions of active and passive electric fields.

The method of the present invention is capable of achieving an average of 95% conversion of $NO_x$ to $N_2$, at a catalyst temperature of 200° C., over prolonged operation of the dual bed base metal exchanged zeolite catalysts. The reductant species from the reformed diesel fuel do not degrade the catalyst.

The exhaust leaving a diesel engine contains unburned hydrocarbons, especially diesel particulates, and carbon monoxide that are preferably eliminated by catalytic oxidation and filtering of the exhaust prior to the ozone addition to the exhaust.

Other objects and advantages of the invention will be apparent from a description of a preferred embodiment which follows.

DESCRIPTION OF THE PREFERRED EMBODIMENT

Figure 1:
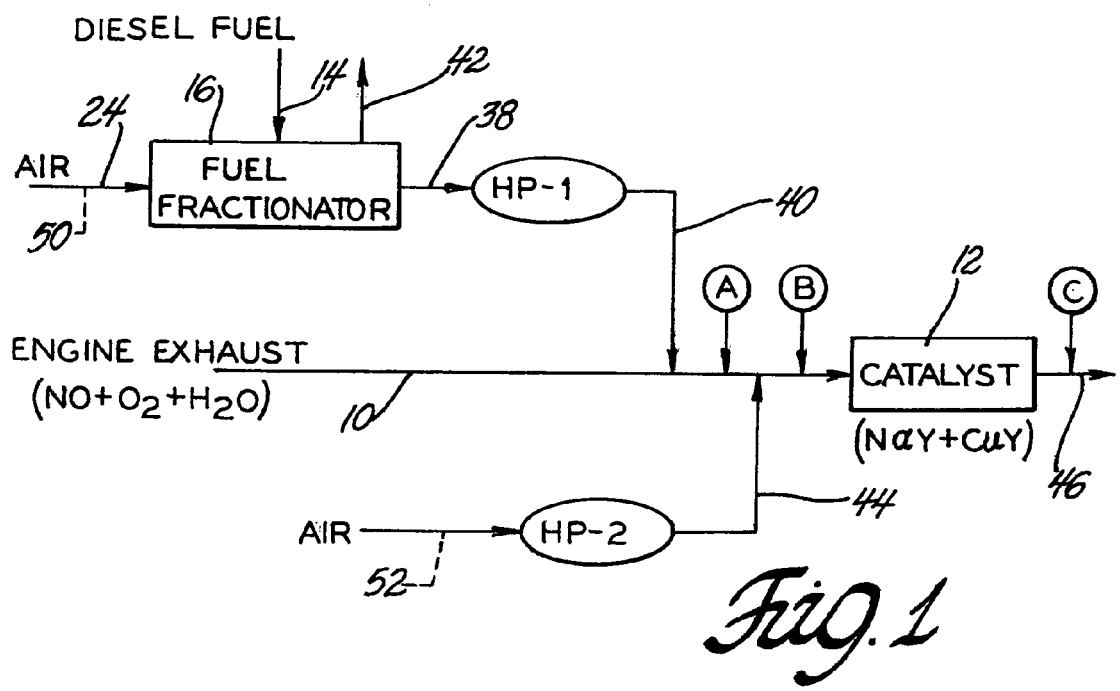
FIG. 1 is a schematic flow diagram for exhaust from a diesel engine illustrating a preferred method for $NO_x$ reduction in accordance with this invention.

A practice of the invention is illustrated schematically in FIG. 1. Line 10 represents the flow of the exhaust gas from a diesel engine, not shown. Diesel engines are typically operated at air-to-fuel mass ratios that are considerably higher than the stoichiometric ratio of air to fuel and the exhaust gas contains an appreciable amount of unreacted $O_2$ as well as $N_2$ (from the air). The temperature of the exhaust from a warmed-up engine is typically in the range of about 200° C. to about 400° C. The practice of the invention will be illustrated in the case of a diesel engine but it is to be understood that the subject method could be used to treat the exhaust of other lean burn hydrocarbon fueled power sources if diesel fuel is available for the exhaust treatment. In diesel engine exhaust, in addition to $O_2$ and $N_2$, the hot gas also contains CO, $CO_2$, $H_2O$ and hydrocarbons (some in particulate form) that are not completely burned. But the constituent of the exhaust gas to which the subject invention is applicable is the mixture of nitrogen oxides (largely NO and $NO_2$ with a trace of $N_2O$, collectively referred to as $NO_x$) that are formed by reaction of $N_2$ with $O_2$ in the combustion cylinders of the engine (or power plant). The content of $NO_x$ in diesel exhaust is typically about 200–300 parts per million (ppm). So the purpose of this invention is to treat nitrogen oxides that constitute a very small fraction of the volume of the exhaust stream.

Exhaust stream 10 ultimately flows to a dual bed catalytic reduction reactor 12 for conversion of the $NO_x$ content of the exhaust to $N_2$. Although not shown in the FIG. 1 exhaust flow diagram for illustration of an embodiment of this invention, the diesel engine exhaust may first be treated by catalytic oxidation and filtration for removal of diesel particulates and other unburned hydrocarbons. Following such oxidation and/or filtration, two important additions are made to exhaust stream 10 before it reaches reduction reactor 12.

Figure 2:
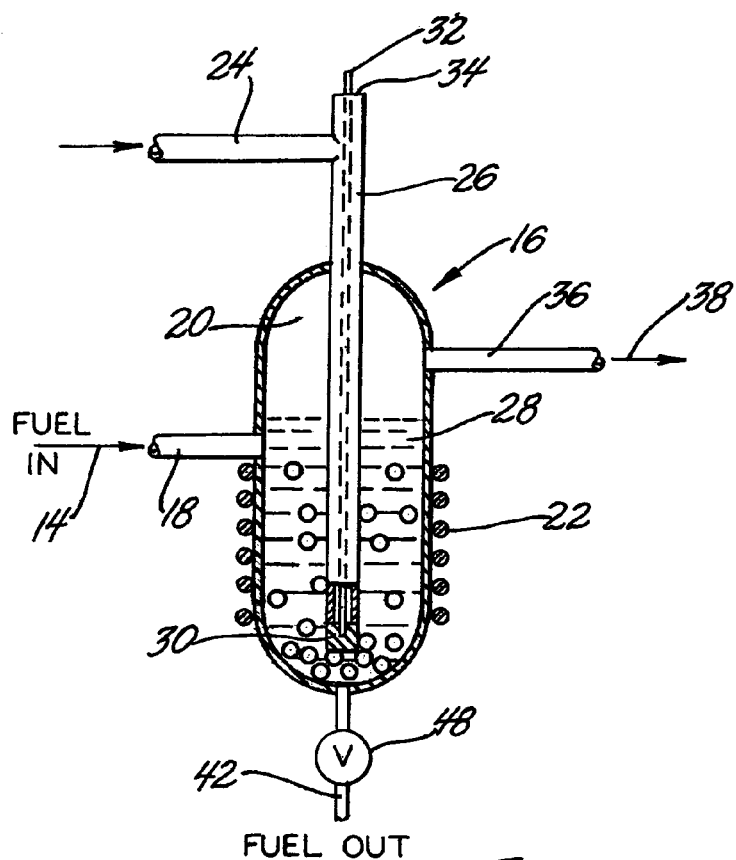
FIG. 2 is a schematic view of an apparatus and method for fractionation of diesel fuel in the practice of this invention.

Reference is made to FIGS. 1 and 2. Diesel fuel, suitably from the fuel supply for the engine, is pumped, line 14 to a fuel fractionator 16. The fuel enters inlet 18 (FIG. 2) and is received in the aeration chamber 20 as fuel volume 28. Aeration chamber 20 and fuel volume 28 are heated using external heating coil 22 to a suitable temperature, e.g. 200° C., for air vaporization of the low volatility hydrocarbon fuel. Ambient air is inducted, by blower means not shown, through air line 24 to vertical air feed tube 26 and, thus, into the bottom of chamber 20 below the surface of fuel volume 28. The stream of air exits feed tube 26 through quartz frit 30 and bubbles up through fuel volume 28. Thermocouple 32, inserted through an otherwise closed end 34 of air feed tube 26, extends down feed tube 26 to a suitable location below the surface of fuel volume 28. Thermocouple 32 is used in a known manner for control of heater coil 22 in maintaining the temperature of fuel volume 28 at temperature suitable for fractionation of the diesel fuel.

The air stream bubbling through the heated fuel volume 28 of diesel fuel leaves the fractionator 16 through air/fuel outlet 36. The ambient air bubbling through the heated fuel volume 28 strips out (vaporizes) a fraction of the fuel volume 28 to form an air stream carrying the more volatile, lower molecular weight hydrocarbons from the fuel. This hydrocarbon laden air stream flows through line 38 to a non-thermal, highly efficient plasma reactor, HP-1, for plasma reforming of the hydrocarbons. The structure and function of the efficient plasma reactor HP-1, termed a hyperplasma reactor, (and similar reactor HP-2 for ozone generation from ambient air) will be described below in connection with the illustration of FIG. 3. In plasma reactor HP-1, the hydrocarbon molecules fractionated from the diesel fuel volume 28 are reformed and oxidized to form reactive $NO_x$ reduction material, still carried in the air stream, through line 40 into exhaust stream 10. The reformed fuel comprises hydrocarbons such as propane and propylene and oxygenated hydrocarbons such as formaldehyde, acetaldehyde and ethyl alcohol.

When fractionator 16 is used in combination with an operating engine the fractionation process is a continuous process. As the air stream, line 24, strips out a relatively more volatile portion of fuel volume 28 the remainder of volume 28 becomes smaller and enriched with less volatile hydrocarbons. This portion of the withdrawn fuel is returned either to the fuel tank or to the fuel delivery line for combustion in the engine. Accordingly, it is preferred that diesel fuel be pumped continually to and from the fractionator 16 as follows. A measured volume of fuel is introduced into inlet 18 continuously or in suitable periodic batches. As fractionated fuel is removed in the flowing air stream, line 38, residual fuel is drawn from fuel volume 28 through the bottom of fractionator 16 at outlet 42 and returned either to the fuel tank or to the fuel delivery line. The return flow of fuel is controlled by valve 48, or other suitable means, to maintain a suitable fuel volume 28 in chamber 20. Thus, in an operating engine embodiment, fuel and air are continuously delivered to fractionator 16 through fractionator inlets 18 and 24, respectively, and streams of air/fractionated fuel and residual fuel are withdrawn through fractionator outlets 36 and 42.

Figure 3:
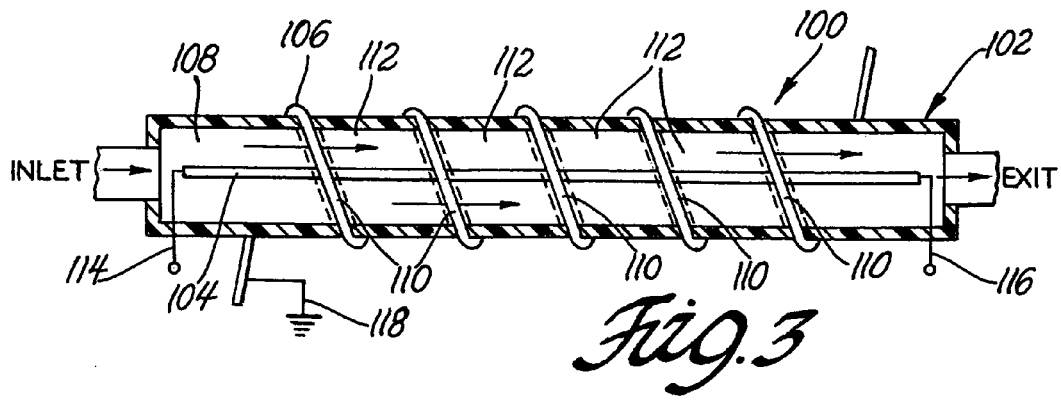
FIG. 3 is a side view, partly in cross section, of a non-thermal plasma reactor used for treating fractionated diesel fuel to produce a reductant for use in the practice of this invention.

In FIG. 3, a non-thermal hyperplasma reactor 100 is illustrated that is suitable for use in reforming fractionated diesel fuel in a stream of air, and for generating ozone in a stream of air, both for use in the practice of this invention. The reactor 100 is sized and powered for its specific application.

Non-thermal plasma reactor 100 comprises a cylindrical tubular dielectric body 102. The reactor 100 has two electrodes, a high voltage electrode 104 and a ground electrode 106, separated by the tubular dielectric body 102 and an air gap 108. The high voltage electrode 104 is a straight rod placed along the longitudinal axis of the tube 102. The ground electrode 106 is a wire wound around the tubular dielectric body 102 in a helical pattern. The helical ground electrode 106 in combination with the axial high voltage electrode 104 provides intertwined helical regions of active 110 and passive 112 electric fields along the length of the reactor 100. The helical active electric field 110 around the ground electrode 106 is highly focused for effective plasma generation for the reforming of diesel fuel and for ozone generation.

A high voltage, high frequency electrical potential is applied to the end leads 114, 116 to the center electrode. The helical outer ground electrode 106 is grounded as indicated at 118. In the operation of the plasma reactor 100 as HP-1 for reformation of the fractionated diesel fuel, a mixture of the fuel and air flows through the INLET of reactor 100 around center electrode 104 and within dielectric tube 102 and out EXIT end in the direction of the arrows seen in FIG.

3. The electrical potential applied to center electrode 104 generates the above described active 110 and passive 112 fields within the reactor 100. These high potential, high frequency fields 110, 112 generate reactive hydrocarbon species and oxygen species within the flowing air/fuel stream in the air gap 108 which results in the production of oxygenated hydrocarbon radicals or other activated species. This oxygenated hydrocarbon-containing air stream leaves the reactor 100 (HP-1), enters line 40, and is immediately introduced into the exhaust stream 10 as indicated in FIG. 1.

As will be described in detail below, electrical power is applied to HP-1 reactor at a level that is suitable to generate the reformed oxygenated hydrocarbon material. HP-1 reactor is located close to, but away from, the hot exhaust pipe. HP-1 plasma reactor is a non-thermal reactor but entering stream 38 may be above ambient temperature because ambient air was used to vaporize heated fuel volume 28 in fractionator 16.

In addition to air/reformed diesel fuel stream 40, ozone is generated in an ambient air stream and injected into exhaust stream 10. Referring again to FIG. 1, ambient air is blown through a second plasma reactor, HP-2. Preferably, plasma reactor HP-2 is a suitable adaptation of a non-thermal plasma reactor 100 as described with respect to FIG. 3. Alternatively, a commercial ozone generator may be used. When the ambient air is subjected to the high intensity alternating electric field in HP-2 a fraction of the air is converted to ozone and the ozone/air mixture leaving HP-2 through line 44 is injected into exhaust stream 10 downstream of line 40, the reformed diesel fuel containing stream.

As seen in FIG. 1, the hot exhaust stream 10 containing suitable additions of reformed diesel fuel, stream 40 and ozone, stream 44, enters the dual bed catalytic reduction reactor 12.

Figure 4:
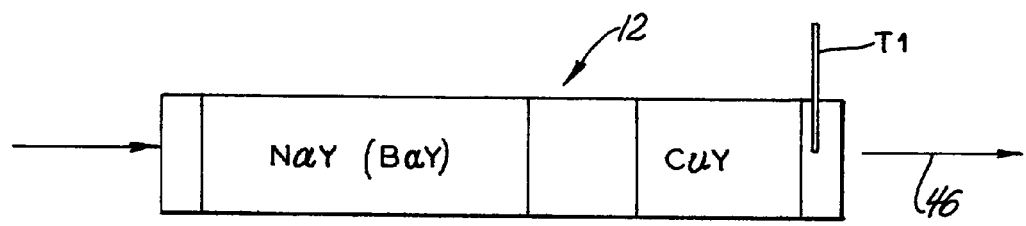
FIG. 4 is a schematic view of a dual-bed base metal-exchanged Y zeolite catalytic reduction reactor as used in an embodiment of this invention.

As illustrated in FIG. 4, catalytic reduction reactor 12 houses a dual bed reduction catalyst. The upstream catalyst bed comprises a volume of sodium (or barium) Y zeolite, indicated as NaY (or BaY), and the downstream bed, usually a smaller volume, comprises copper Y zeolite (indicated as CuY). Y-type zeolites are aluminosilicate materials of rather specific alumina-to-silica ratio and crystal structure. They have ion-exchange capability and they are commercially available, often in their $Na^+$ ion form. In the practice of this invention NaY may be converted to BaY or CuY by aqueous ion exchange.

The temperature at the reactor 12 outlet is used in controlling plasma power density in HP-1 and HP-2, respectively and the volumetric feed ratios of reformed diesel fuel, line 40, and ozone, line 44 for effective operation of the catalytic reduction reactor 12. For example, the temperature at the outlet of the reduction catalyst may be monitored for effective exhaust gas treatment by thermocouple (indicated at T1) or other suitable temperature sensor(s). Temperature data is transmitted to a digital controller (not shown) for controlling plasma power density and amount of stream additions through lines 40 and 44. Stream 46 indicates the treated exhaust being discharged from the exhaust system.

The heat and hydrocarbon content of stream 46 may be utilized by using it to supplement or replace a portion of air stream 24 entering fuel fractionator 16 and/or the air stream entering ozone reactor HP-2. These recycled exhaust streams 50 (to fractionator 16) and 52 (to HP-2) are shown schematically in FIG. 1.

In general, the requirement for reformed diesel fuel constituents increases with increased $NO_x$ content in the exhaust and increased exhaust temperature (catalytic reactor temperature). For example, about 8 moles of reformed fuel, normalized as $C_1$ hydrocarbon per mole of normalized $NO_x$ at a catalyst temperature of 200° C. Conversely, the ozone requirement is greatest at catalytic reactor temperatures of 150–200° C. and decreases to zero at reactor temperatures of 350–400° C.

The following experiments illustrate the practice and effectiveness of the invention.

Experimental

A simulated diesel exhaust gas composed, by volume, of 181.5 ppm NO, 24.5 ppm $NO_2$, 17.6% $O_2$, 2% $H_2O$ and the balance $N_2$ was used in the following laboratory scale tests. This simulated exhaust gas was used as stream 10 in FIG. 1 for eventual catalytic reduction in a dual bed catalytic reactor as indicated at 12 in FIG. 1.

The dual bed catalytic reactor was made of a quartz tube with a ¼ inch (about 6.4 mm) outside diameter, 4 mm inside diameter, and containing NaY zeolite in an upstream bed and CuY in the downstream bed. CuY zeolite was made from NaY by aqueous ion-exchange of NaY obtained from Zeolyst Corp. The amounts of NaY and CuY used were 422 mg and 211 mg, respectively. The catalytic reactor was placed in an electric furnace whose temperature was controlled by a thermocouple located at the exit of the catalytic reactor. In these tests the catalytic reactor was maintained at 200° C.

A batch operation fractionator like that illustrated in FIG. 2, but without fuel exit line 42, was made of a quartz bulb. Raw diesel fuel was contained in the bulb at a sufficient level. Air fed through the inlet tube and the vertical air feed tube flowed through the quartz frit making bubbles. The air bubbles generated a large surface area for diesel fuel evaporation while agitating the liquid fuel during their travel upward, resulting in an enhanced evaporation of diesel fuel. The temperature of the liquid fuel was controlled by adjusting the electric power supply to the heating element in response to the readings of a thermocouple. Though the preferred temperature range is 100–250° C. to fractionate a low-boiling portion of the fuel, a temperture of 200° C. was employed. The flow rate of ambient air to the fractionator was 34 cubic centimetes per minute at standard conditions (sccm). The air and low-boiling diesel fraction flowed through the exit to the hyperplasma reactor (HP-1) for reforming.

A hyperplasma reactor for the fractionated diesel fuel was made in accordance with the reactor illustrated in FIG. 3. The reactor was made of a 8 mm o.d. (6 mm i.d.) quartz tube which served as a dielectric barrier. With the high voltage electrode in the center, it was made in a concentric cylindrical geometry. Air and vaporized diesl fuel at an unmeasured exhaust temperature from the fractionator entered HP-1. HP-1 was unheated and the air/fractionated fuel mixture flowed through the annular space between the center elctrode and the quartz tube. The ground electrode was made of a Ni wire wound around the outer surface of the quartz tube in 20 turns at a pitch of 2 mm. The total length of the plasma generating area was 4 cm. An alternating high voltage of +/−7 kV was applied to the center electrode at a power level of 2.7 J/L. The reformed fuel was analyzed and contained propane, propylene, formaldehyde, acetaldehyde and ethanol. The carbon content of the reformed fuel may be normalized in terms of molar methane ($C_1$) content for purposes of simplifying process control. The amount of $C_1$ content of the reformed fuel is based on the $NO_x$ content of the exhaust and the temerature of the exhaust or catalytic reactor. The reformed diesel fuel was fed to the simulated diesel engine exhaust gas stream before the stream reached the dual bed catalytic reactor.

A commercial ozone generator was used as HP-2. Air at room temperature was fed to the generator at 45 sccm and the air/ozone output of the generator containing 1200 ppm ozone was added to the simulated diesel exhaust downstream of the addition of reformed fuel and before the exhaust stream was passed through the catalytic reactor. This concentration of ozone in the air stream was suitable for the catalytic reactor operating at 200° C. and lower. The ozone requirement decreases, generally proportionately, as the temperature of the reactor increases. When the catalyst is at about 350° C. and higher, no ozone addition is required.

The simulated exhaust, reformed fuel, and ozone entered the dual bed catalyst reactor at a combined flow rate of 179 sccm and at a pressure of 101.3 kPa. The $C_1/NO_x$ ratio at the inlet of the catalyltic reactor (sample location B in FIG. 1) was around 8. The space velocity in the 200° C. reactor was 11 k/h for the NaY bed and 22 k/h for the CuY bed. At higher catalyst temperatures the proportion of reformulated fuel, C1, increases.

Figure 5:
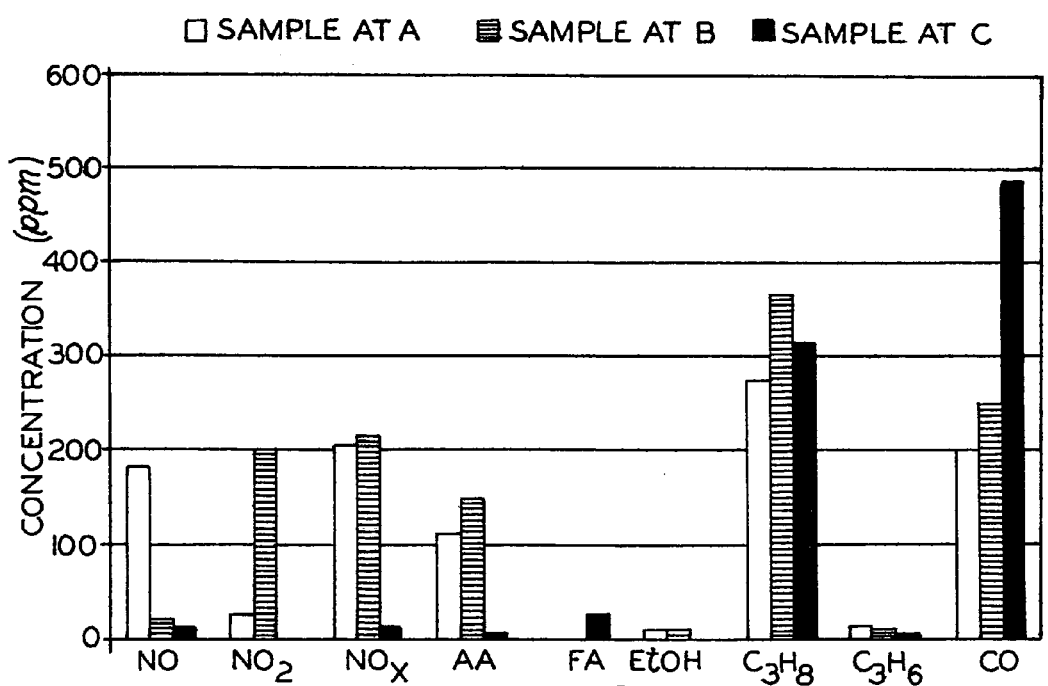
FIG. 5 is a bar graph showing the concentrations in parts per million (ppm) of NO, $NO_2$, $NO_x$, acetaldehyde (AA), formaldehyde (FA), ethanol, propane, propylene, and carbon monoxide at locations A, B and C in the exhaust stream as designated in FIG. 1.

FIG. 5 shows the product distribution measured by an FTIR at each sampling position (A, B and C in FIG. 1) in the system. As specified above, the normalized exhaust composition with the hyperplasmas turned off was 181.5 ppm NO and 24.5 ppm $NO_2$. Sampling position A shows the effect on exhaust gas composition of the addition of reformed diesel fuel. Sampling positon B shows the effect on exhaust gas compositon following the ozone addition. And sampling positon C shows the compositon of the gas leaving the catalytic reduction reactor.

FIG. 5 indicates that the major role of the first hyperplasma (HP-1) is to produce acetaldehyde (AA), while the major role of the second hyperplasma ($O_3$ generator) is to oxidize NO to $NO_2$ in the exhaust gas stream. The data on $NO_x$ concentrations in FIG. 5 clearly demonstrates that the subject process can achieve 95% $NO_x$ conversion at the catalyst temperature of 200° C. This is a remarkable performance better than anything reported in the literature using diesel fuel as the reductant.

Figure 6:
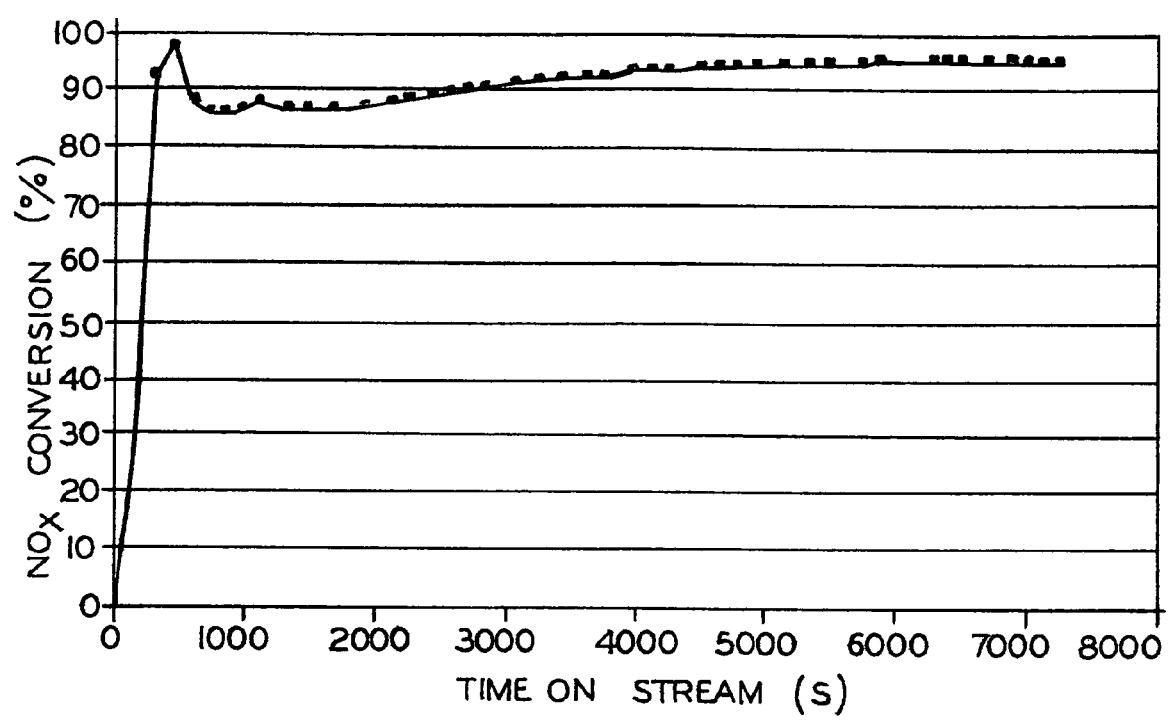
FIG. 6 is a graph showing the $NO_x$ conversion at the exit of the catalytic reactor versus time-on-stream of the dual bed catalyst over the first two hours of operation.

FIG. 6 shows the transient $NO_x$ conversion performance of the dual-bed catalytic reactor at 200° C. for the first two hours of operation. When the exhaust flow stream was fed to the catalytic reactor, the $NO_x$ conversion reached above 90% and then decreased slightly, followed by a steady increase to steady-state conversion of 95%. There was no noticebale deactivation of catalyst activity.

Figure 7:
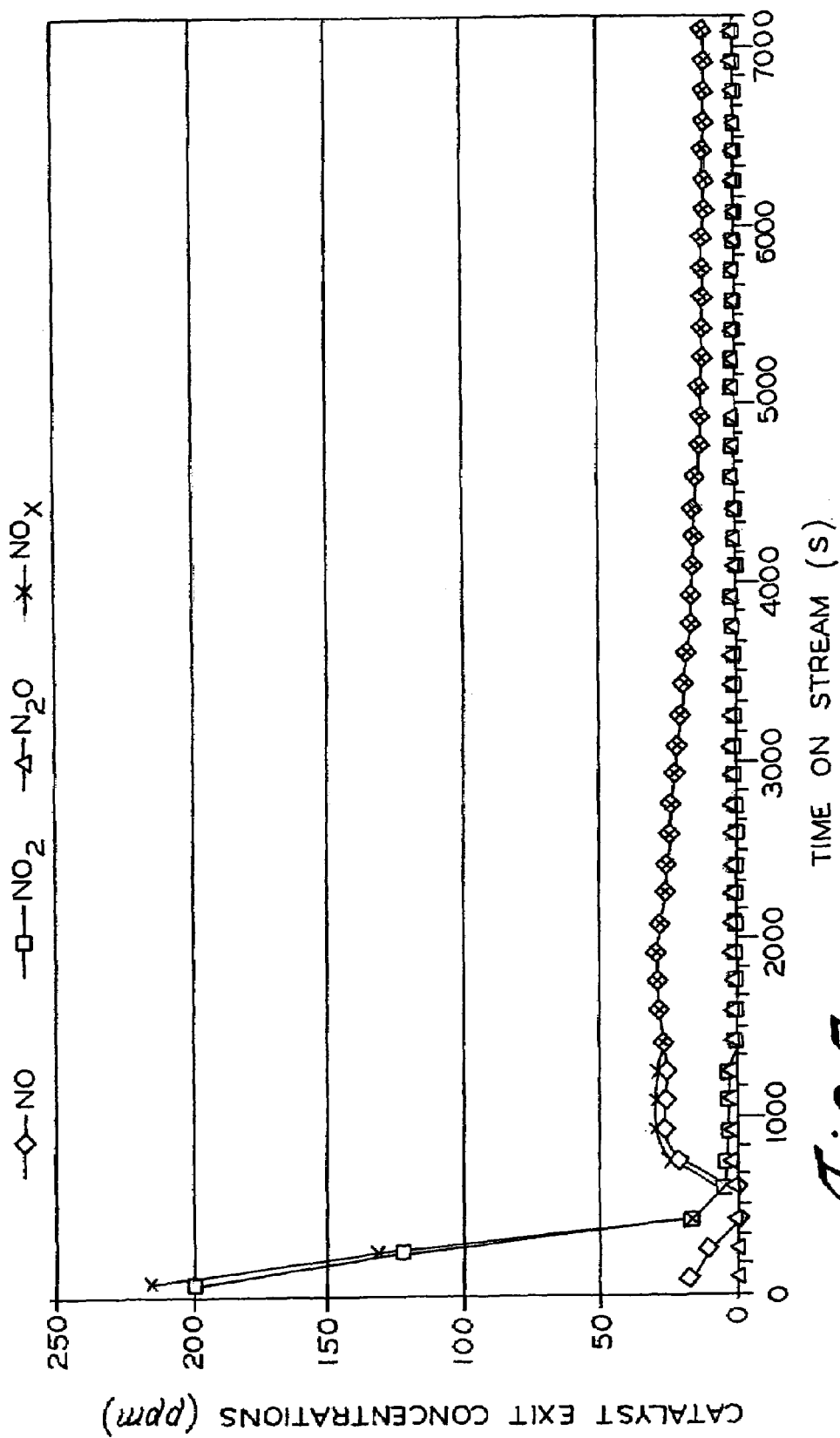
FIG. 7 is a graph of the concentrations in ppm of NO, $NO_2$, $N_2O$ and $NO_x$ at the exit of the catalytic reactor versus time-on-stream of a dual bed catalyst over the first two hours of operation.

FIG. 7 shows the transient evolution of N-containing species at the outlet of the catalytic reactor in the D/SCR system. The catalysts reached the steady state in about 90 minutes on stream without any indication of catalyst deactivation. The amounts of other N-containing species such as $N_2O$, $NO_2$, HCN and $NH_3$ were negligible.

The invention has been described by illustration of specific embodiments but the scope of the invention is not limited to them.

What is claimed is:

1. A method of reducing nitrogen oxides, including NO and $NO_2$, in an exhaust stream at a temperature above about 150° C., said method comprising:
   treating diesel fuel in a non-thermal plasma reactor to make reformed diesel fuel containing oxidized hydrocarbons;
   adding said reformed diesel fuel to said exhaust stream for the reduction of said nitrogen oxides;
   generating an ozone containing plasma separately from the making of the reformed diesel fuel and adding said ozone containing plasma to said exhaust stream for oxidation of NO to $NO_2$, said ozone containing plasma being added to said exhaust stream separately from said plasma treated diesel fuel; and, thereafter
   contacting said exhaust stream with a dual bed reduction catalyst comprising at least one of NaY zeolite and BaY zeolite in the first bed and CuY zeolite in the second bed to reduce said nitrogen oxides to $N_2$.

2. The method of reducing nitrogen oxides as recited in claim 1 when said exhaust stream is a diesel engine exhaust stream.

3. A method of reducing nitrogen oxides, including NO and $NO_2$, in an exhaust stream from a diesel engine when the temperature of said exhaust stream is at a temperature at or above about 200° C., said engine having a source of hydrocarbon containing diesel fuel, said method comprising:
   withdrawing a volume of said fuel from said source and treating it in a first non-thermal plasma reactor to make a reformed diesel fuel containing oxidized hydrocarbons;
   adding said reformed diesel fuel to said exhaust stream for the reduction of said nitrogen oxides;
   generating an ozone containing plasma separately from the making of the reformed diesel fuel and adding said ozone containing plasma to said exhaust stream for oxidation of NO to $NO_2$, said ozone containing plasma being added to said exhaust stream separately from said plasma treated diesel fuel; and, thereafter
   contacting said exhaust stream with a dual bed reduction catalyst comprising at least one of NaY zeolite and BaY zeolite in the first bed and CuY zeolite in the second bed to reduce said nitrogen oxides to $N_2$.

4. The method of reducing nitrogen oxides as recited in claim 3 wherein said first plasma reactor is a tubular vessel having a reactor space therein for flow-through passage therein, said plasma reactor comprising a high voltage electrode disposed within said reactor space and a ground electrode helically coiled around said tubular vessel in a discretely spaced pattern, thereby providing intertwined helical passive and active electric fields for the generation of said reformed diesel fuel.

5. The method of reducing nitrogen oxides as recited in claim 3 in which the quantity of reformed diesel fuel added to said exhaust stream is in molar proportion to the quantity of $NO_x$ in said exhaust stream.

6. The method of reducing nitrogen oxides as recited in claim 3 comprising:
   withdrawing a volume of said fuel from said source;
   bubbling a stream of air through said volume of withdrawn fuel to remove a fuel vapor fraction from said fuel carried in said air stream and to leave a liquid fuel fraction; and
   treating said fuel vapor fraction in said non-thermal plasma reactor to make said reformed diesel fuel.

7. The method of reducing nitrogen oxides as recited in claim 6 comprising heating said volume of withdrawn fuel to a temperature in the range of about 100° C. to 250° C.

8. The method of reducing nitrogen oxides as recited in claim 6 comprising returning at least a portion of said liquid fuel fraction to said fuel source.

9. The method of reducing nitrogen oxides as recited in claim 3 comprising generating said ozone containing plasma by passing a stream of air through a second non-thermal plasma reactor.

10. The method of reducing nitrogen oxides as recited in claim 9 wherein said second plasma reactor is a tubular vessel having a reactor space therein for flow-through passage therein, said plasma reactor comprising a high voltage electrode disposed within said reactor space and a ground electrode helically coiled around said tubular vessel, thereby providing intertwined helical passive and active electric fields for the generation of said ozone.

11. The method of reducing nitrogen oxides as recited in claim 9 in which the energy applied to said plasma reactor is inversely proportional to the temperature of the reduction catalyst at temperatures in the range of about 150° C. to 400° C. with said energy being reduced to zero at temperatures of about 350° C. and higher.

* * * * *